United States Patent
Conn et al.

(10) Patent No.: US 10,082,006 B2
(45) Date of Patent: Sep. 25, 2018

(54) REDUCED SPACE CLUSTERING REPRESENTATIVES AND ITS APPLICATION TO LONG TERM PREDICTION

(71) Applicant: International Business Machines Corporation, Armonk, NY (US)

(72) Inventors: Andrew R. Conn, Mount Vernon, NY (US); Lior Horesh, North Salem, NY (US); Ulisses T. Mello, Blauvelt, NY (US); Gijs Michiel van Essen, The Hague (NL); Sippe Geert Douma, Taranaki (NZ); Eduardo Antonio Jimenez Arismendi, Pembroke Pines, FL (US)

(73) Assignees: International Business Machines Corporation, Armonk, NY (US); SHELL OIL COMPANY, Houston, TN (US)

( * ) Notice: Subject to any disclaimer, the term of this patent is extended or adjusted under 35 U.S.C. 154(b) by 378 days.

(21) Appl. No.: 14/922,637

(22) Filed: Oct. 26, 2015

(65) Prior Publication Data

US 2017/0114619 A1    Apr. 27, 2017

(51) Int. Cl.
| G01V 1/40 | (2006.01) |
| E21B 43/00 | (2006.01) |
| G06F 17/10 | (2006.01) |

(52) U.S. Cl.
CPC .............. *E21B 43/00* (2013.01); *G06F 17/10* (2013.01)

(58) Field of Classification Search
CPC .... G01V 99/005; G01V 11/00; G01V 11/002; G01V 2210/612; G01V 2210/642; G01V 2210/646; G01V 99/00; G01V 1/30; G01V 1/306; G01V 1/40; G01V 3/081; G01V 3/082; G01V 3/16; G01V 3/165; G06K 9/00

See application file for complete search history.

(56) References Cited

U.S. PATENT DOCUMENTS

| 2010/0004870 A1 | 1/2010 | Tonellot et al. |
| 2010/0142323 A1 | 6/2010 | Chu et al. |
| 2010/0185428 A1 | 7/2010 | Vink |
| 2011/0054869 A1 | 3/2011 | Li et al. |
| 2012/0136641 A1 | 5/2012 | Fung et al. |

FOREIGN PATENT DOCUMENTS

WO    2011/100009 A1    8/2011

OTHER PUBLICATIONS

"Singular value decomposition", http://en.wikipedia.org/wiki/Singular value_decompositions, acessed on Sep. 29, 2014, 1 page.

(Continued)

*Primary Examiner* — Robert Bachner
(74) *Attorney, Agent, or Firm* — Scully, Scott, Murphy & Presser, P.C.; Daniel Morris, Esq.

(57) ABSTRACT

In one embodiment, a technique is provided to cluster model prior realizations into flow-equivalent sets. Thereby, far fewer representatives are identified from each cluster that can still predict the same range of future production reliably. Only representatives of each realization cluster that indicate unique forecasts will undergo the computationally expensive process of history matching.

20 Claims, 13 Drawing Sheets

(56) References Cited

OTHER PUBLICATIONS

Yeh, T., et al., "Reservoir Uncertainty Quantification Using Probabilistic History Matching Workflow", SPE Annual Technical Conference and Exhibition, Amsterdam, The Netherlands, Oct. 27-29, 2014, pp. 1-12.

Stenerud, V.R., et al., "Streamline-Based History Matching: A Review", SINTEF Report, (Nov. 30, 2007), 51 pages.

Ates, H., et al., Ranking and Upscaling of Geostatistical Reservoir Models Using Streamline Simulation: A Field Case Study, SPE 13th Middle East Oil Show & Conference, Bahraid, Jun. 9-12, 2003, pp. 1-10.

Fenwick, D., et al., "Reconciling Prior Geologic Information With Production Data Using Streamlines: Application to a Giant Middle-Eastern Oil Field", 2005 SPE Annual Technical Conference and Exhibition, Dallas, TX, Oct. 9-12, 2005, pp. 1-13.

Evensen, G., et al., "Using the EnKF for Assisted History Matching of a North Sea Reservoir Model", 2007 SPE Reservoir Simulation Symposium, Woodlands, TX, Feb. 26-29, 2007, pp. 1-13.

"Singular value decomposition", https://en.wikipedia.org/wiki/Singular_value_decomposition, accessed on Feb. 17, 2015, 13 pages.

REDUCED SPACE CLUSTERING REPRESENTATIVES AND ITS APPLICATION TO LONG TERM PREDICTION

BACKGROUND

Prediction of flow of fluids through a reservoir has been used for certain scenarios (e.g., well placement, production optimization, etc.) where it is desirable for supporting business/investment decisions. For efficient recovery of oil and gas from a reservoir, a good understanding of the subsurface attributes and its constituents is vital.

Conventionally, production data consisting of measurements of pressures in the wells, along with liquid (oil and water) and gas flow rates, is used in attempt to recover the subsurface attributes. The process in which this is performed is called history matching. In this process, the model parameters (such as permeability, porosity, skin, seal factors) are altered so that simulation of flow would match the recorded production data at the wells. There are several strategies for updating the model parameters, including manual trial and error. The most widely accepted approach is based upon non-linear optimization. In such non-linear optimization, the problem is cast as minimization of an objective function that consists of a measure of misfit (likelihood) between the real measured data and the one that is simulated for a choice of model parameters. e.g.:

$$\hat{m} = \underset{m}{\mathrm{argmin}}\; J \equiv \underbrace{D(P(u(m;y)), d(y))}_{\text{data misfit}} + \underbrace{S(m)}_{\text{regularization}}$$

$$\text{s.t.}\; g(m;u) = 0$$

constraints where m denotes the model parameters, J is the objective function, D is a noise model, P is a function that converts the state u (saturation and pressure for flow in porous medium) into simulated measurement, y denotes the experimental design setup and d denotes the real data. As a constraint, the state u must comply with the governing physics of the problem (flow in porous medium represented through partial differential equations along with appropriate boundary conditions) as represented by the operator g.

This objective function may involve additional terms, such as regularization (e.g. S representing a regularization function that incorporates a-priori information into the objective), or additional constraints (e.g. positivity or bounds for some parameters).

Unfortunately, with respect to ill posedness and uncertainty, the acquired production data do not typically convey sufficient information for a complete and stable recovery of the subsurface properties and, consequently, the resulting solutions are corrupted by the intrusive null space of the solution space. With respect to that concern is that the sensitivity of the acquired data at the wells towards changes in the model parameters away from the wells is negligibly small.

Despite efforts to supplement missing information by means of multi-modality (e.g. incorporation of seismic, electromagnetic (EM), gravity data) inversion, or through incorporation of a-priori information (via regularization, re-parameterization), a great extent of uncertainty in determining the subsurface properties remains. This uncertainty is typically accounted for through extensive sampling of the model prior space, that is, multiple plausible subsurface realizations are generated. These can account for uncertainty in model parameter distribution, in candidate well placement or with any other uncertain parameters.

With respect to the "model prior space" mentioned above, it is noted that as uncertainties are involved in this problem, the problem is dealt with in Bayesian inference settings. In these settings, a goal is to get samples of the posterior probability (model probability distribution given the data). Using Bayes theorem, the posterior distribution is proportional to the product of the likelihood (probability of the data, given the model) by the prior probability (the probability of the model). In other words, this means that the posterior distribution is a compromise between trusting merely the data (likelihood) and trusting merely the prior knowledge regarding the model (the prior probability). The model prior space is a space that includes all model configurations and their assigned probabilities.

Since these realizations are drawn from prior distribution of the model space, it is unlikely that given a set of prescribed controls y, the realizations would conform with the recorded real data d. For that reason, the conventional workflow requires obtaining estimates of the posterior distribution of the uncertain parameters through the aforementioned process of history matching. Once a posterior distribution is obtained, one is typically interested in the way uncertainty is manifested in terms of future forecasts for a given set of future controls. The forecast spread can then be used as a factor for making judicial business and operational decisions.

Of note, as mentioned above, the "posterior distribution" assigns posterior probabilities to each of the possible models. The posterior distribution reflects authentically the settings of the problems, the given data (e.g. production data), and possibly some prior knowledge regarding the model (e.g. a probability may be assigned to each model instance), and a goal is to quantify the probability of having the model in any set configuration.

In the context of large-scale problems and extensive set of realizations, this framework is rendered impractical due to the computationally prohibitive costs of computing multiple history matching processes for each realization.

If not only the prior samples, but also their corresponding posteriors and thereby future forecasts are distinct, there might be no computationally tractable resolution for the problem.

Fortunately, often this is not the case as different model realizations may correspond to (almost) similar dynamic behavior. Given a large set of model realizations, the question that this invention addresses is how to conclude a sub-set that on the one hand captures the dynamic variability of the entire set, yet, is indifferent to dynamic redundancy?

SUMMARY

In one embodiment a method for estimating variability of future recovery of a natural resource is provided, the method comprising: receiving, from a database, a plurality of model realizations of the natural resource, the plurality of model realizations representing uncertainty in determining model properties of the natural resource; determining, for each of the plurality of model realizations, respective principal flow pattern coefficients representing a reduced model space; identifying similar principal flow patterns amongst the received plurality of model realizations using the coefficients representing the reduced model space; clustering the received plurality of model realizations according to the identified similar principal flow patterns in the reduced model space, each cluster having a similar principal flow pattern and representing a prior input to a computationally intensive history matching process; and determining variability in natural resource production by future recovery scenarios represented by one or more representatives of each of the clusters of the received plurality of model realizations, wherein the determining the variability comprises a subsequent history matching process and a consequent future simulation to estimate the future production scenarios of the natural resource; wherein a processor connected to a memory device is configured to perform: the receiving the plurality of model realizations, the determining the respective principal flow pattern coefficients, the identifying similar principal flow patterns, the clustering the received plurality of model realizations and the determining the variability.

In another embodiment a computer program product for estimating variability of future recovery of a natural resource is provided, the program code of the computer program product executable by a computer to perform a method comprising: receiving, from a database, a plurality of model realizations of the natural resource, the plurality of model realizations representing uncertainty in determining model properties of the natural resource; determining, for each of the plurality of model realizations, respective principal flow pattern coefficients representing a reduced model space; identifying similar principal flow patterns amongst the received plurality of model realizations using the coefficients representing the reduced model space; clustering the received plurality of model realizations according to the identified similar principal flow patterns in the reduced model space, each cluster having a similar principal flow pattern and representing a prior input to a computationally intensive history matching process; and determining variability in natural resource production by future recovery scenarios represented by one or more representatives of each of the clusters of the received plurality of model realizations, wherein the determining the variability comprises a subsequent history matching process and a consequent future simulation to estimate the future production scenarios of the natural resource.

In another embodiment a computer-implemented system for estimating variability of future recovery of a natural resource is provided, the system comprising: a processor; and a memory storing computer-readable instructions which, when executed by the processor, implement: a receiving element configured to receive, from a database, a plurality of model realizations of the natural resource, the plurality of model realizations representing uncertainty in determining model properties of the natural resource; a first determining element configured to determine, for each of the plurality of model realizations, respective principal flow pattern coefficients representing a reduced model space; an identifying element configured to identify similar principal flow patterns amongst the received plurality of model realizations using the coefficients representing the reduced model space; a clustering element configured to cluster the received plurality of model realizations according to the identified similar principal flow patterns in the reduced model space, each cluster having a similar principal flow pattern and representing a prior input to a computationally intensive history matching process; and a second determining element configured to determine variability in natural resource production by future recovery scenarios represented by one or more representatives of each of the clusters of the received plurality of model realizations, wherein the determining the variability comprises a subsequent history matching process and a consequent future simulation to estimate the future production scenarios of the natural resource.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

Figure 1:
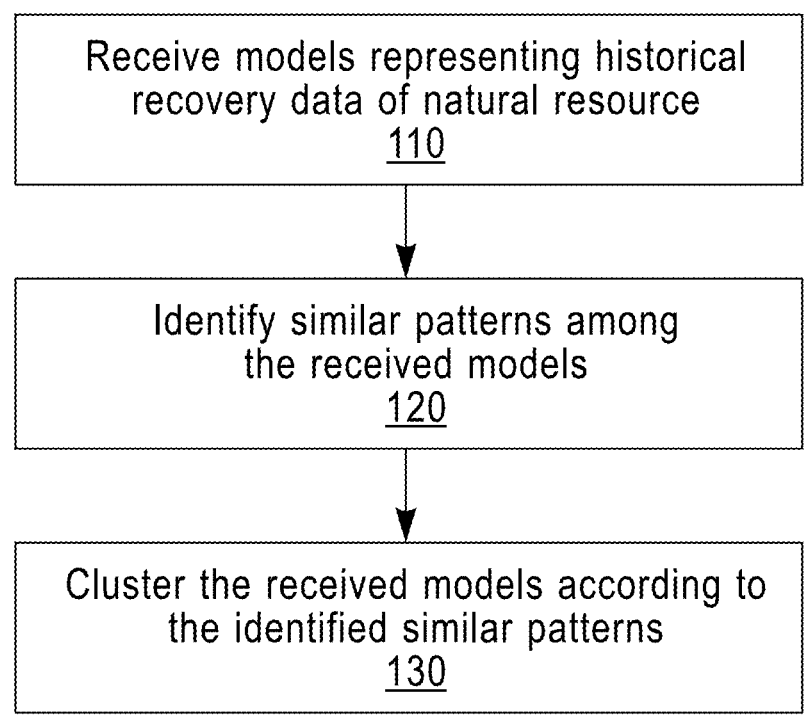
FIG. 1 illustrates a flowchart that describes a method for estimating variability of future recovery of a natural resource according to an embodiment of the present invention.

Based on structural information and geostatistical reasoning, geologists produce multiple model realizations to account for prior uncertainty.

Many geological variations feature little if any measurable impact upon flow patterns. In principle, a large set of geological models is required to capture geological (conceptual) uncertainty. Fortunately, this large set contains much redundancy when judging the models in terms of their flow behavior.

Often, different model realizations may correspond to (almost) similar flow patterns. By linking between flow indicators, such as mass fluxes or time of flight and production data, it is evident that such models are likely to entail similar production forecasts.

The computation of flow indicators is the equivalent of a short simulation and, therefore, substantially faster than an entire history matching process. In order to manage the large dimension of the flow indicators, provided herein is their representation by means of coefficients of a spanning set of the indicators (e.g. compact Singular Value Decomposition).

Each realization's indicator can then be completely captured by a small number of coefficients (their number is of the order of effective rank of the realizations' indicators, rather than of the order of the number of grid blocks in the model discretization). In other words, in this embodiment there is a single indicator per a single realization (wherein the number mentioned in parenthesis above is the total number of indicators for all realizations).

Once the realizations' indicators are captured by the reduced space dominant coefficients, hierarchical clustering is performed. As a result, the technique will end up with a small set of clusters. Each set of clusters aggregates a set of model realizations that, despite their apparent difference in the model space, all correspond to similar principal flow trends.

Lastly, a representative from each cluster is then chosen to be used for the tedious history matching process rather than the entire set within the cluster.

Discussed now (in connection with FIGS. 4A, 4B, 5 and 6), is an example where two very distinct geological models (permeability distributions), based on different geological concepts, display nearly identical production forecasts in the four producer wells (for a particular period in time and a particular set of constraints).

As seen (see FIG. 6, in particular), the graph indicates that the two models (model 1—shown in FIGS. 4A and 5 and model 2—shown in FIG. 4B), provide similar production output, despite their geological dissimilarity.

As described herein, a technique is provided to cluster model prior realizations into flow-equivalent sets. Thereby, far fewer representatives are identified from each cluster that can still predict the same range of future production reliably. Only representatives of each realization cluster that indicate unique forecasts will undergo the computationally expensive process of history matching. As a link between static geology and dynamics as captured by geophysics, the technique comprises considering dynamic fingerprints (such as mass fluxes, time of flight).

The mass flux for a phase a (wherein a phase is a spatial region, through which all physical properties of a material are essentially uniform, e.g. gas, liquid) is given by:

$$F^\alpha = -K\frac{\rho^\alpha \kappa^\alpha}{\mu^\alpha}(\nabla(p + p^\alpha_{cap}) - g\rho^\alpha \nabla z)$$

which is linked to the accumulations and sources through conservation of mass:

$$\frac{\partial(\phi a^c)}{\partial t} - \nabla \cdot F^c = \rho^c q^c$$

where $$F^c = \sum_{\alpha=1}^{N_\alpha} \chi^{c\alpha} F^\alpha$$

$$a^c = \sum_{\alpha=1}^{N_\alpha} \chi^{c\alpha} S^\alpha \rho^\alpha \quad c = 1, \ldots, N_c$$

with t,?
K absolute permeability κ relative permeability μ viscosity
ρ mass density p pressure a accumulation
χ total mass fraction S saturation φ porosity
α phase q source
With respect to the above:
∇ is the mutli-variant (or "directional") derivative operation (i.e., gradient). Note that if followed by a dot symbol, ∇● the operator is the divergence operator.
The cap subscripts stand for capillary (in this context capillary pressure, which is the pressure across the interface between two immiscible fluids).
g is gravitational force.
z stands for the height of the fluid column.
c is the component (e.g. light gas oil, heavy oil, Kerosene, Naphtha).
$N_a$ is the number of phases.
The total mass fraction is the same at all formulas and the total mass fraction maps between phases and components, so it is not an accumulation by itself.

Flow indicators, such as mass fluxes, capture chief characteristics of dynamics, yet, 4D vector fields are of a large dimension. Clustering in such large dimensional space is intractable. Instead, reduced order representation of each flux is considered. Singular value decomposition of vector fields from all realizations enables reduced order representation:

$$U\Sigma V^T = [\vec{F}_1(x,y,z;t), \vec{F}_2(x,y,z;t), \ldots, \vec{F}_n(x,y,z;t)]$$

With respect to the above, the U stands for the left singular vectors (a unitary matrix of which), the Σ is a matrix of the singular values, and $V^T$ stand for the right singular vectors (a unitary matrix of which). To provide more background here, a matrix can be decomposed into a product of these matrices. This decomposition is useful for model reduction purposes.

Representation of each flux realization in the singular vector basis is obtained by projection of the flux realization onto the obtained singular vector:

$$\beta_{ij} = U_j \cdot \vec{F}_i(x, y, z;t), \text{ i}^{th} \text{ realization, j}^{th} \text{ component}$$

With respect to the above:
x,y,z are the spatial coordinates.
t is the temporal coordinate.
$F_n$ is the mass flux field of the $n^{th}$ realization.
$\beta_{i,j}$ are coefficients of representation of the $i^{th}$ realization, $j^{th}$ component.

Figure 7:
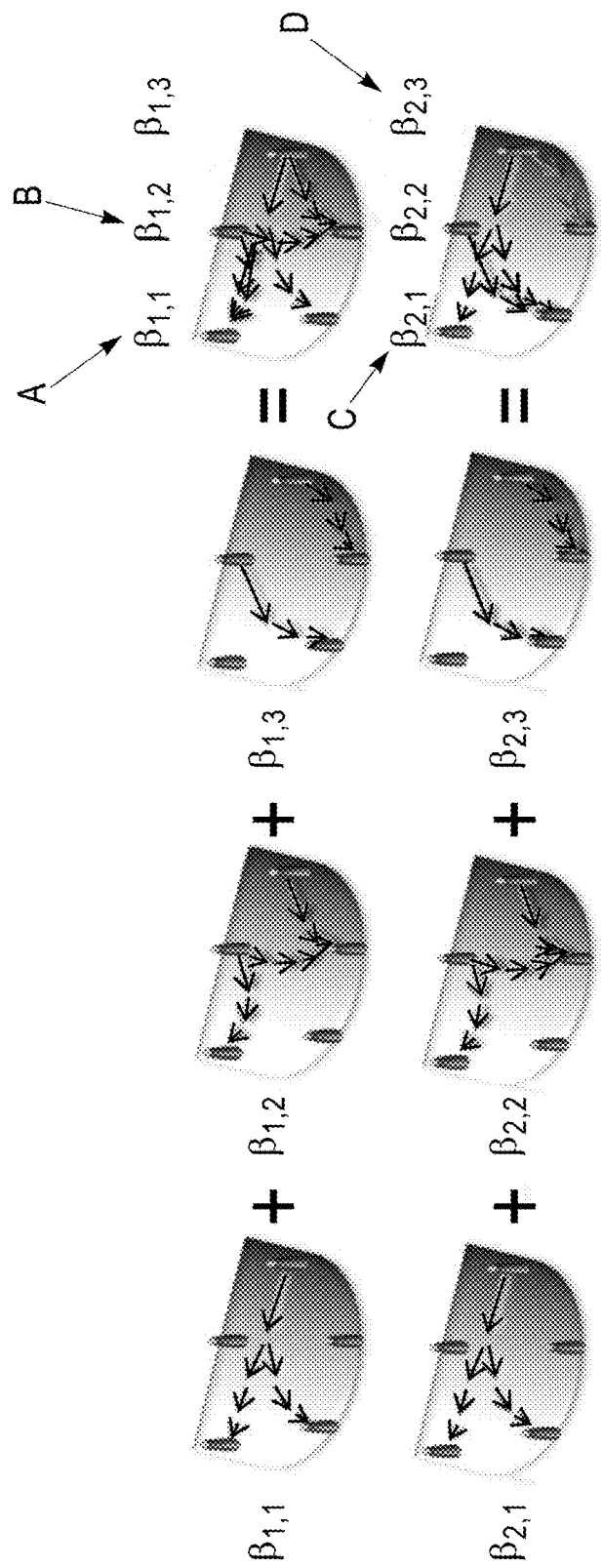
FIG. 7 illustrates an example representation of flux realization according to an embodiment of the present invention.

Discussed now in connection with FIG. 7 is an illustration of such representation of flux realization for two schematic flow models.

Figure 8:
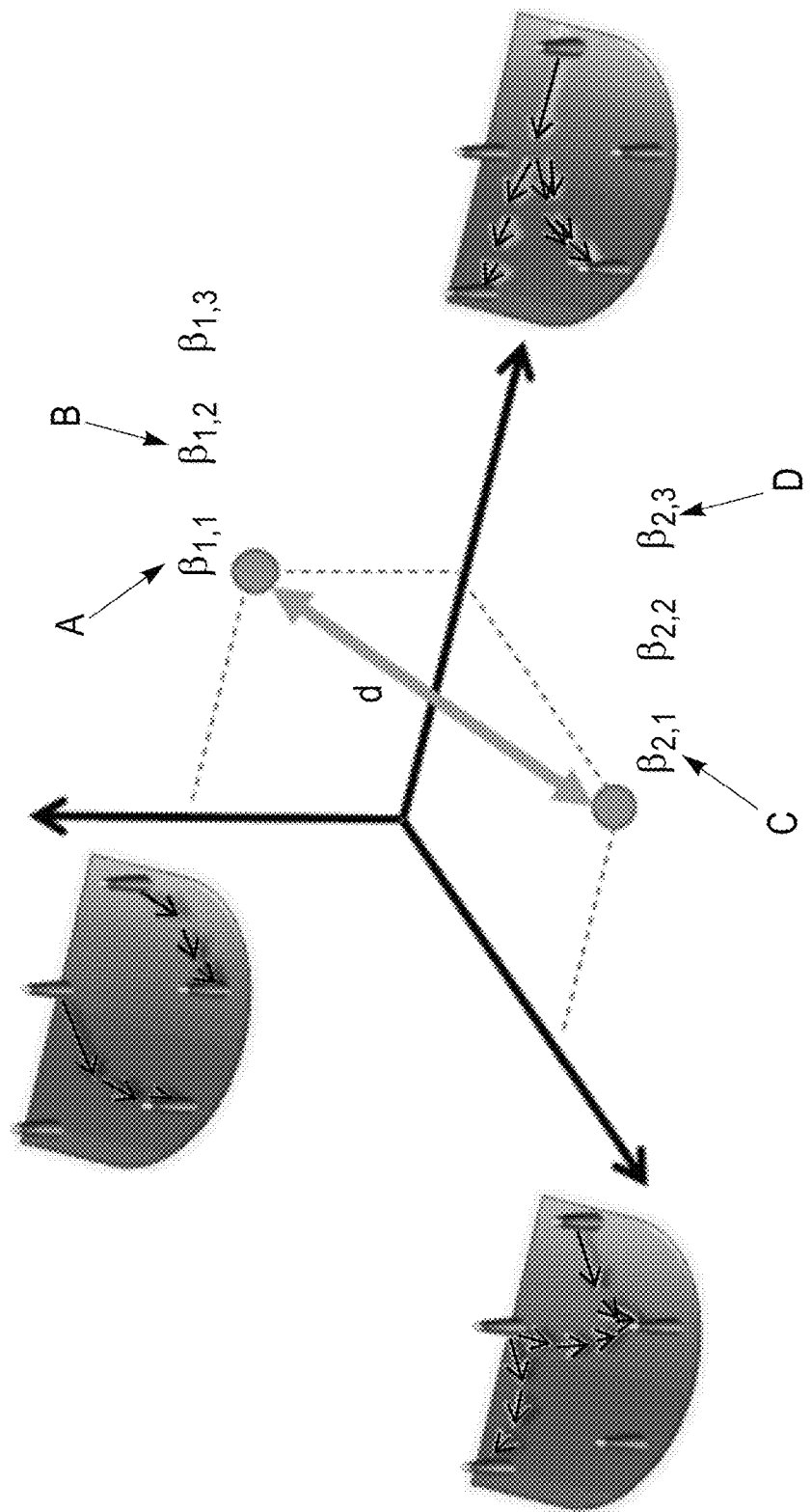
FIG. 8 illustrates an example coefficient distance d according to an embodiment of the present invention (this chart shows how each flow realization is mapped on the reduced space of principal flow directions)

The first model (the upper rightmost element) is represented merely by two positive entries for its two first coefficients and zeros for the third (see arrows A and B in this FIG. 7 and in FIG. 8), while for the second model (the lower rightmost element), the first and the third coefficients are non-zero (see arrows C and D in this FIG. 7 and in FIG. 8). Regardless, using only 3 scalars, a complex flow pattern is represented.

FIG. 7 illustrates the idea of reduced space representation—the first 3 columns represent principle flow regimes, and the rightmost column stands for a desired dynamic flow realization (model). Each of the realizations of flow on the right most column can be represented as a linear combination of a few principal flow regimes. The representation only requires knowledge of the principal flow regimes (which serves as a spanning set) and the coefficients of representation (e.g. for the first realization $\beta1,1$, $\beta1,2$, $\beta1,3$).

Once coefficients are assigned to each realization, distances between relevant representations of flow indicator characteristics can be quantified in the representation coefficient space (see FIG. 8). Clustering of realizations is based on similarity of flow indicator values in the representation coefficient space.

Still referring to FIG. 8, in one example, agglomerative ("bottom-up") hierarchical clusters are constructed based on coefficient distances (short links=similar objects). One specific example may operate as follows: Initially, each realization is regarded as a separate cluster; the distance (level of dissimilarity) between each realization is computed per a predefined metric. Next the clusters that are closest to each other (have the smallest level of dissimilarity) are merged together to form a new cluster. Then the process is repeated until a tree-like (hierarchical) clustering structure is formed. The longer the link between two members, the more dissimilar they are.

Presented below is an example recursion loop process of the above shown in the form of pseudo code:

```
% initialization
S0 = {all realizations} %all realizations are regarded as clusters
level = 0;
remaining = true;
% loop until there are no more sub clusters to cluster
While remaining == true
{
level = level+1;
[c1, c2] = min(dist(S(level−1))) %find the 2 realizations / clusters, c1 and
    c2 of the set S(level−1) of the shortest distance
new = newCluster({c1,c2}) % form a new cluster from the two
    nearest realizations / clusters
S(level) = S(level−1) \ {c1, c2} ∪ {new} %the new set of remaining
    clusters is the previous one with the exclusion of the two closest
    ones, and the addition of the new unified cluster
If size(S(level)) == 1 then remaining = false; %only a single cluster is
left in the current level set
}
```

As described herein, a realization is a sample from some distribution. In this context these are samples of the prior distribution. Each such realization is a possible subsurface model. There is a probability associated with each such realization (for instance, there are models that are more likely, since they resemble subsurface geological structures, whereas other potential models may not resemble any viable geology, and therefore be assigned with small probability)

Figure 9:
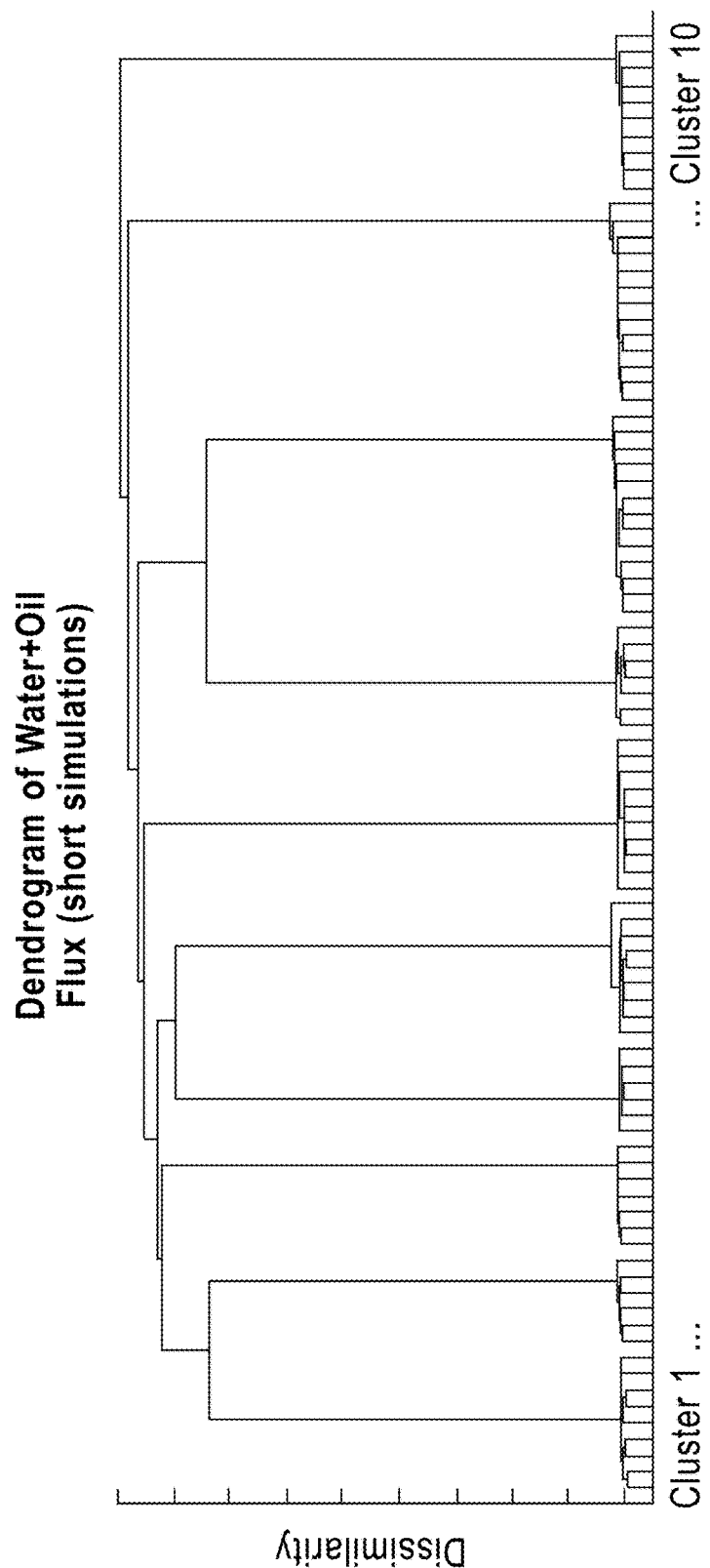
FIG. 9 illustrates an example hierarchical ordering of clusters and example cluster dendrogram according to an embodiment of the present invention.

Referring now to FIG. 9, an insight into confidence (separation) between clusters can be gained by observing the cluster dendrograms. In this regard, for a set of subsurface model realizations, dynamic indicators were processed (based on mass fluxes in this case). A reduced space representation of the indicators was obtained per the processing described herein. Consequently, the representation coefficients were clustered hierarchically. The dendrogram presents graphically the results of the hierarchical clustering. Each realization is represented at the bottom as a single point, and the points are connected in clusters upwards in the chart. The lengths of the links connecting the realizations, and later on the clusters, is proportional to the relative distance between the members of each cluster (i.e. if two clusters are close to each other, a short link will connect them, if they are afar, a longer link will connect them). In this example, the realizations were clustered in a distinct manner into 10 clusters initially (the different sections in the graph).

Figure 10A:
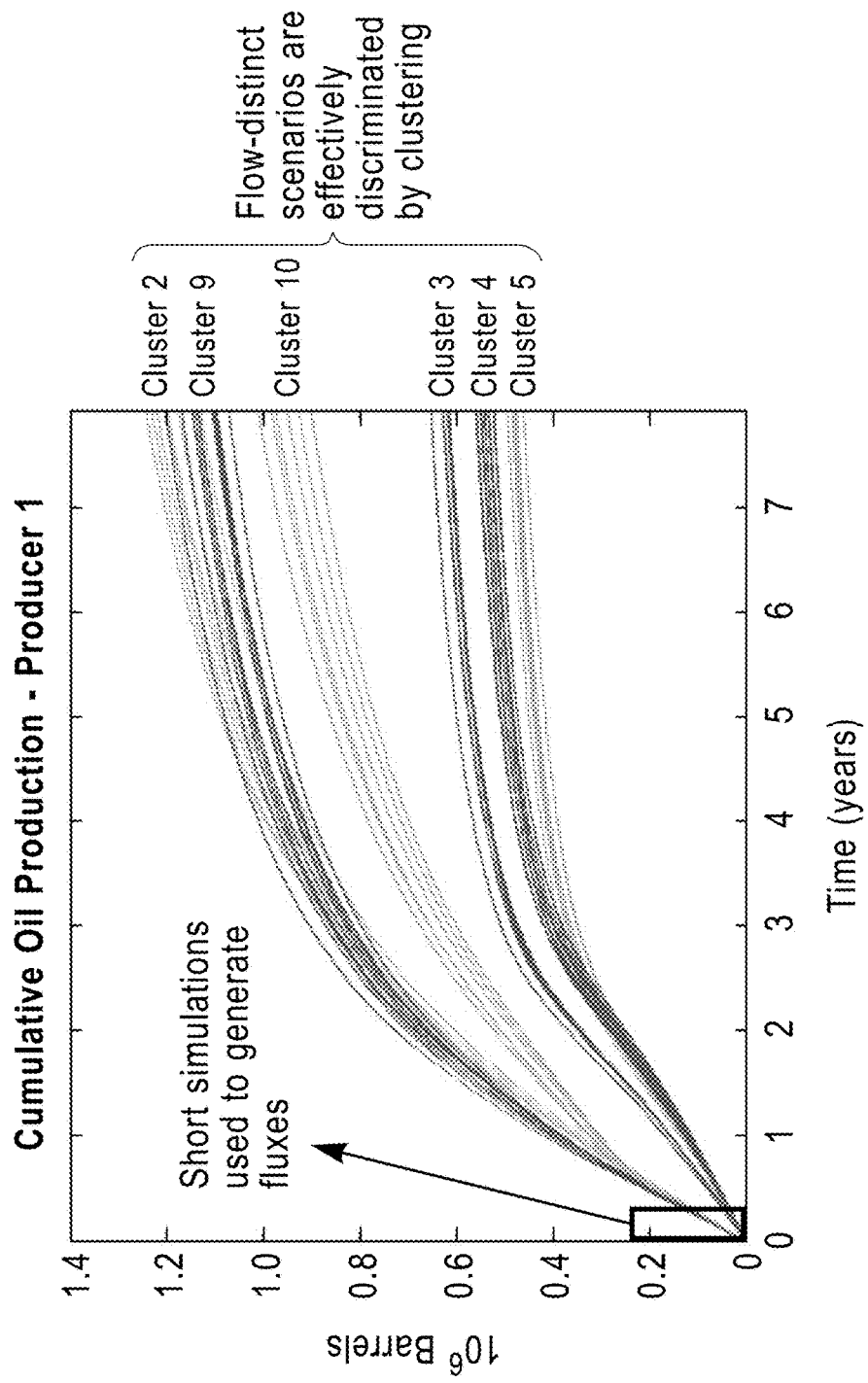
FIGS. 10A and 10B illustrate, respectively, example cumulative oil production and BHP clusters according to an embodiment of the present invention.
Figure 10B:
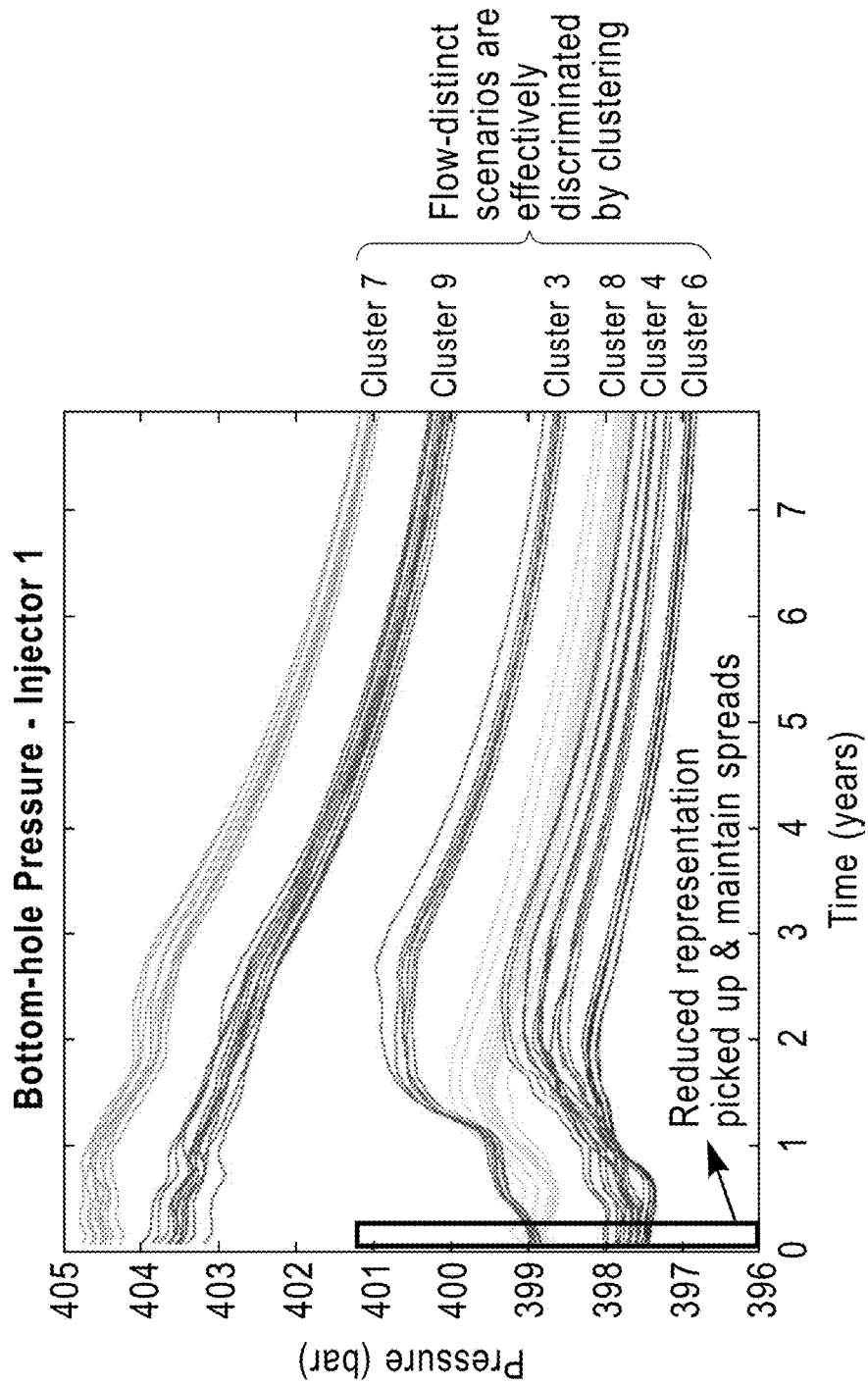

Further, as seen in FIGS. 10A and 10B, in order to assess that these clusters indeed correspond to different production scenarios, one can observe the corresponding future forecasts for each realization (coded according to the flow indicator clustering).

Still referring to FIGS. 10A and 10B, the rather distinct "rainbow" stripes indicate that realizations that were identified as flow-equivalent indeed provided similar future forecasts.

As a consequence, for most operational and business decisions, picking a single representative from each cluster for the computationally intensive history matching process typically suffices.

Figure 11A:
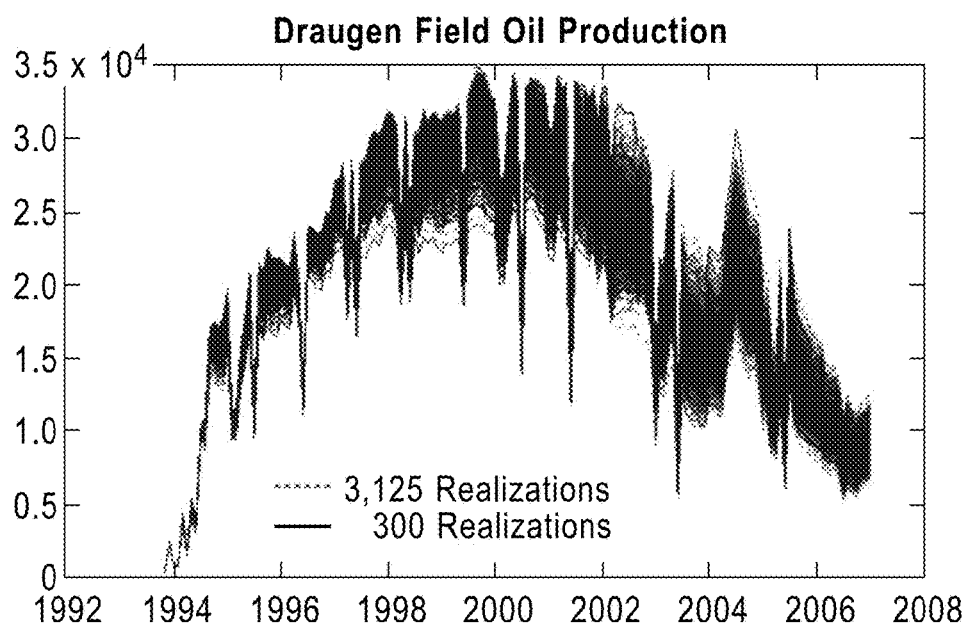
FIGS. 11A and 11B illustrate, respectively, example field oil production and field water production according to an embodiment of the present invention.
Figure 11B:
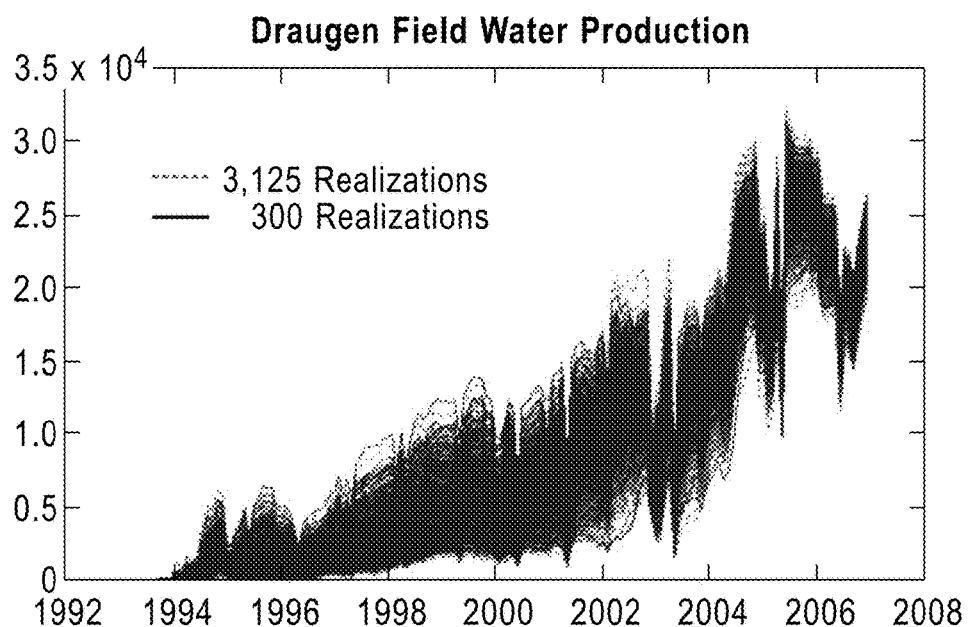

Referring now to FIGS. 11A and 11B, the geological variability of the reservoir as indicated by a set of 3125 realizations is demonstrated. In the two illustrations, the reservoir oil and water production for a long future horizon is provided, both using the complete set (dashed line) as well as with a representative set (continuous line). The small set, of 300 realizations, captures successfully the spread of the larger set.

Reference will now be made to an outline of certain underpinnings and an example process according to an embodiment: (1) simulation is a tool linking between given subsurface model parameters and controls as input with expected production outcomes as output; (2) history matching is a computationally intensive process in which for a given historical production data, known controls and a prior model, model parameters are determined; (3) to connect the dots, if a simulation is carried out upon a history matched model, the expected data as output of the simulation process is similar to the historical data; (4) history matching is an inverse problem, thus, for a given historical data, there are multiple model parameter instances that equally match the historical data; (5) variability in resolving the subsurface model parameters due to ill-posed nature of the problem, is inevitable, yet, needs to be quantified; (6) this is particularity important, as history matched models are used for future production prediction, using simulation into the future; (7) to proficiently quantify variability in future production, it is therefore essential to exhaustively explore the entire prior space (i.e. provide the history matching process all possible model parameters configurations); (8) due to the computational intractability of such an approach it is essential to identify a finite subset of these prior realizations that can effectively capture the variability of the entire set; (9) to do so, we run a short characterizing simulation for each prior model realization; (10) a function of the output of these characterizing simulations (e.g. mass fluxes, time of flight, etc) is used as an indicator for the dynamic signature of each realization; (11) luckily, many realizations, that are distinct in their model parameters, may manifest similar dynamic behavior, i.e. their indicators, are almost the same; (12) we would like to qualify how different these indicators of each realization are from each other, in order to cluster those that are approximately equivalent into a small subset of clusters; (13) due to the high dimensionality of the aforementioned indicators (e.g. 4D vector fields), we need some form of model reduction; (14) we achieve such a model reduction by performing singular value decomposition upon the above flow indicators; (15) each left singular vector represent a principal flow pattern; (16) now, it is possible to represent each flow indicator, as a linear combination of the aforementioned left singular vectors; (17) all that is required for representation of each indicator is the coefficients that links to the principal flow patterns, rather than the entire singular vectors themselves; (18) with the new representation, in the coefficients space, the distance between the flow indicators, that represent the dynamic behavior of each model realization, can be readily computed; (19) once distances between each model realization flow indictor and all others are computed, an hierarchical clustering is performed; (20) in the process, realizations that are close to each other (relative to a predefined threshold) are merged together as clusters; (21) once the realizations are clustered in this fashion, a small subset of representative realizations can be selected to serve as model prior realizations to the subsequent history matched process; (22) each of the history matched models associated with each of the representative prior model realizations can now be used in a prediction simulation to capture the entire variability of the future production.

Figure 12:
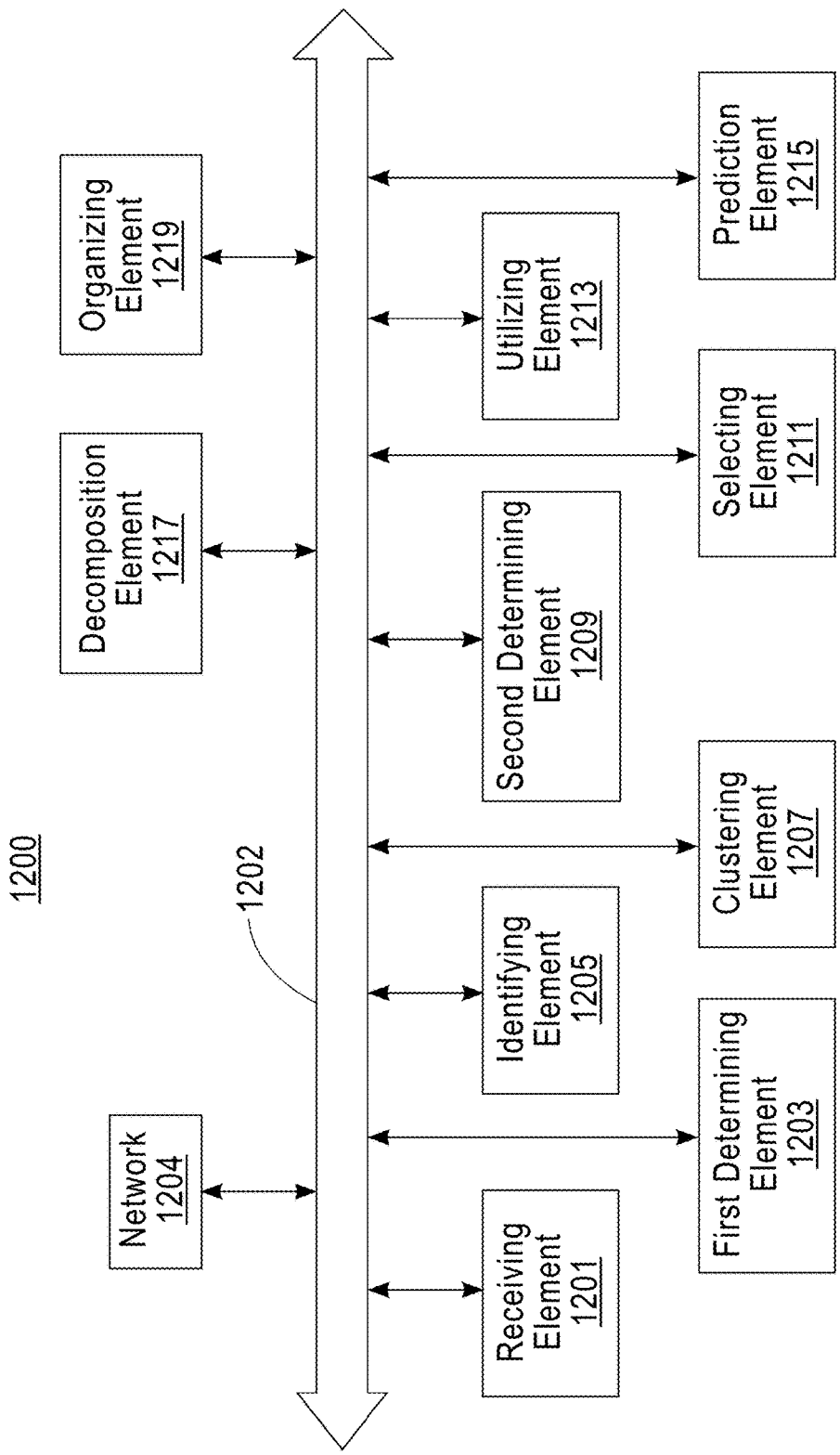
FIG. 12 depicts a block diagram of a system according to an embodiment of the present invention.

Referring now to FIG. 12, in another embodiment, a computer system 1200 for estimating variability of future recovery of a natural resource is provided. This computer system may include a processor (not shown) and a memory (not shown) storing computer-readable instructions which, when executed by the processor, implement the following elements: a receiving element 1201 configured to receive, from a database, a plurality of model realizations of the natural resource, the plurality of model realizations representing uncertainty in determining model properties of the natural resource; a first determining element 1203 configured to determine, for each of the plurality of model realizations, respective principal flow pattern coefficients representing a reduced model space; an identifying element 1205 configured to identify similar principal flow patterns amongst the received plurality of model realizations using the coefficients representing the reduced model space; a clustering element 1207 configured to cluster the received plurality of model realizations according to the identified similar principal flow patterns in the reduced model space, each cluster having a similar principal flow pattern and representing a prior input to a computationally intensive history matching process; and a second determining element 1209 configured to determine variability in natural resource production by future recovery scenarios represented by one or more representatives of each of the clusters of the received plurality of model realizations, wherein the determining the variability comprises a subsequent history matching process and a consequent future simulation to estimate the future production scenarios of the natural resource.

Still referring to FIG. 12, the computer-readable instructions, when executed by the processor, may implement the following elements: a selecting element 1211 configured to select a representative of each cluster; a utilizing element 1213 configured to utilize a respective representative model realization as prior input to the computationally intensive history matching process that employs historical production data; a prediction element 1215 configured to subsequently perform future prediction of the natural resource production through simulation, whereby the prediction simulation run successfully represents the variability of the entire set of model realizations; a singular value decomposition element 1217 configured to perform singular value decomposition upon the flow indicators to enable reduced representation of respective associated flow patterns related to the dynamic behavior of each model realization; and an organizing element 1219 configured to hierarchically organize each cluster, each cluster aggregating a set of one or more of the received model realizations.

Still referring to FIG. 12, each of the elements may be operatively connected together via system bus 1202. In one example, communication between and among the various elements may be bi-directional. In another example, communication may be carried out via network 1204 (e.g., the Internet, an intranet, a local area network, a wide area network and/or any other desired communication channel (s)). In another example, some or all of these elements may be implemented in a computer system of the type shown in FIG. 13.

Figure 13:
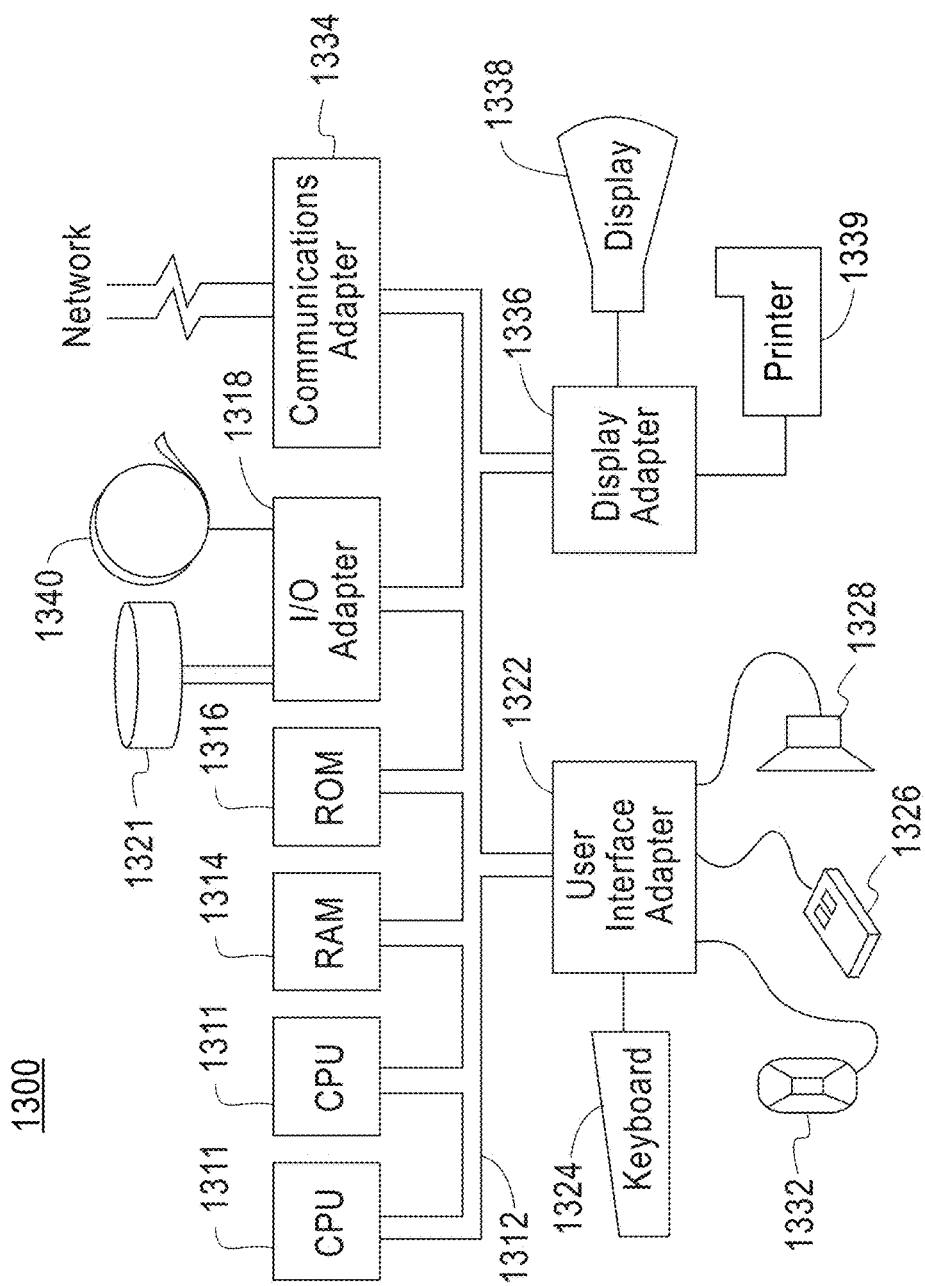
FIG. 13 depicts a block diagram of a system according to an embodiment of the present invention.

Referring now to FIG. 13, this figure shows a hardware configuration of computing system 1300 according to an embodiment of the present invention. As seen, this hardware configuration has at least one processor or central processing unit (CPU) 1311. The CPUs 1311 are interconnected via a system bus 1312 to a random access memory (RAM) 1314, read-only memory (ROM) 1316, input/output (I/O) adapter 1318 (for connecting peripheral devices such as disk units 1321 and tape drives 1340 to the bus 1312), user interface adapter 1322 (for connecting a keyboard 1324, mouse 1326, speaker 1328, microphone 1332, and/or other user interface device to the bus 1312), a communications adapter 1334 for connecting the system 1300 to a data processing network, the Internet, an Intranet, a local area network (LAN), etc., and a display adapter 1336 for connecting the bus 1312 to a display device 1338 and/or printer 1339 (e.g., a digital printer or the like).

Figure 2:
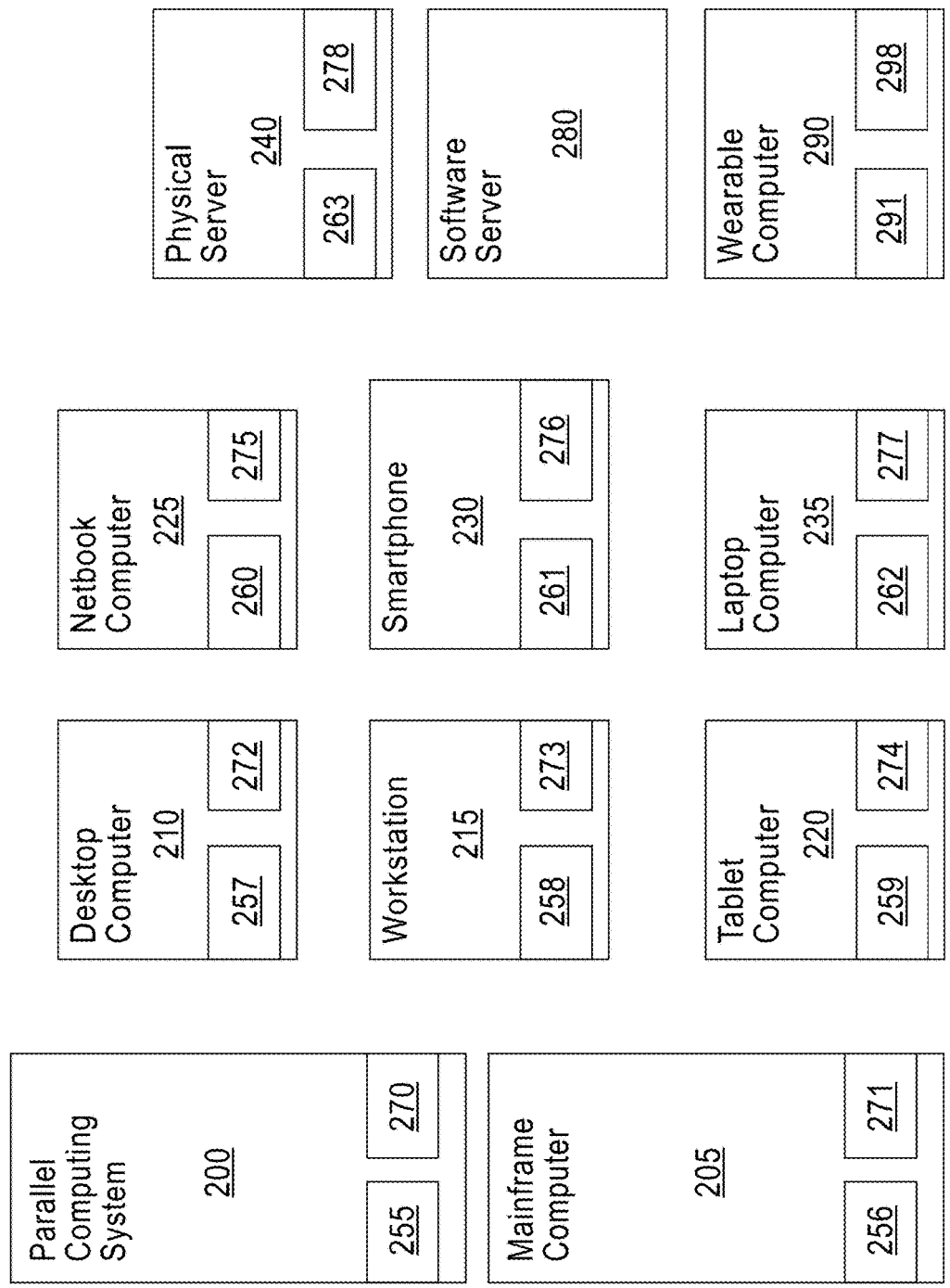
FIG. 2 illustrates a hardware configuration that implement methods shown in FIGS. 1 and 3 according to an embodiment of the present invention.
Figure 3:
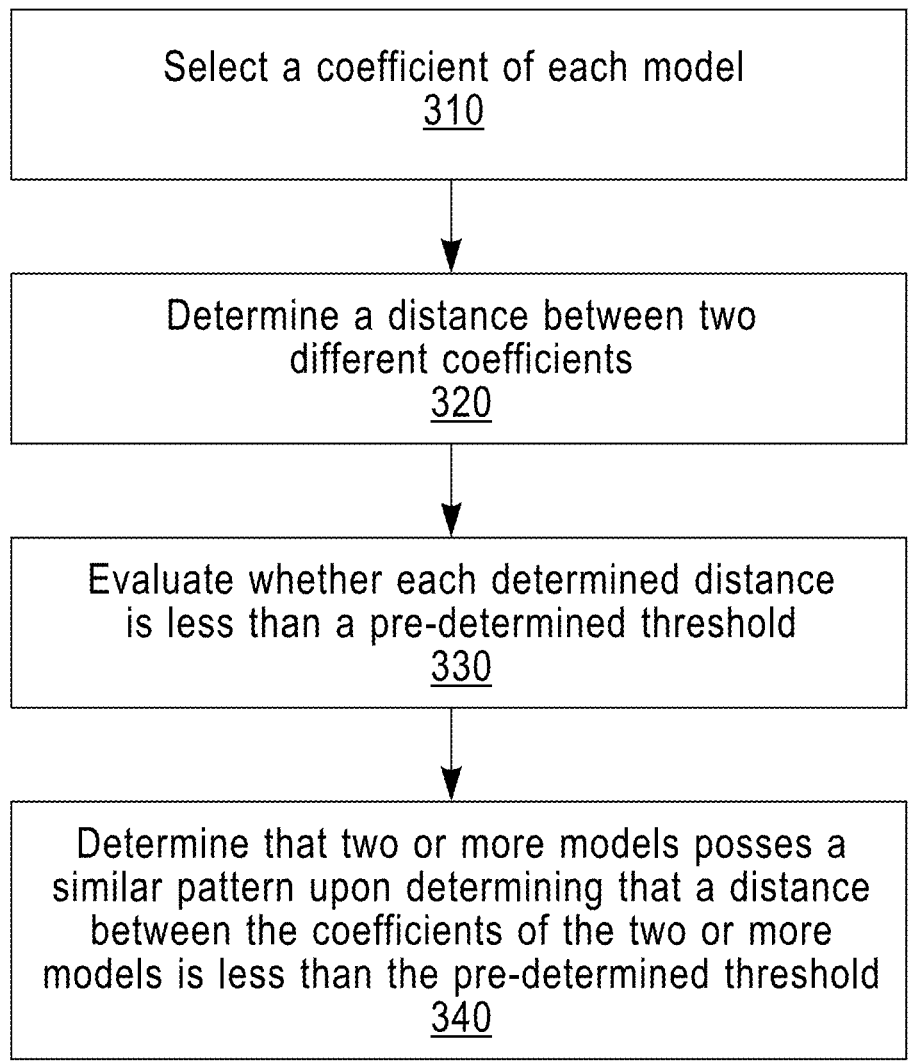
FIG. 3 illustrates a flowchart that describes a method for identifying similar patterns in received models according to an embodiment of the present invention.
Figure 4A:
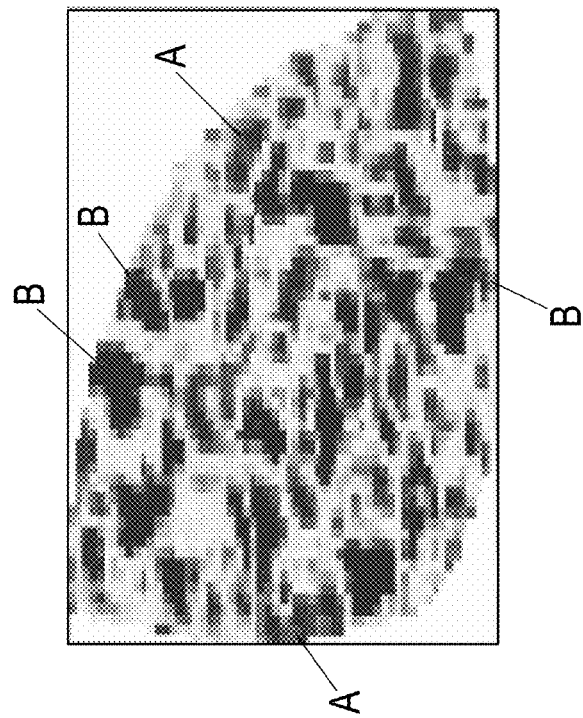
FIG. 4A illustrates a first example of a reservoir model (model 1) according to an embodiment of the present invention (in this FIG. 4A, certain areas (denoted as "A") correspond to highly permeable regions whereas certain areas (denoted as "B") correspond to low permeability)
Figure 4B:
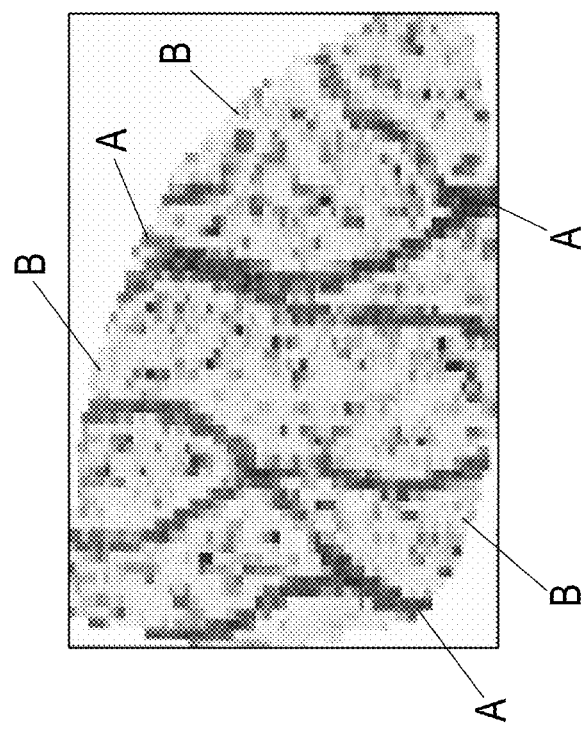
FIG. 4B illustrates a second example of a reservoir model (model 2) according to an embodiment of the present invention (in this FIG. 4B, certain areas (denoted as "A") correspond to highly permeable regions whereas certain areas (denoted as "B") correspond to low permeability)
Figure 5:
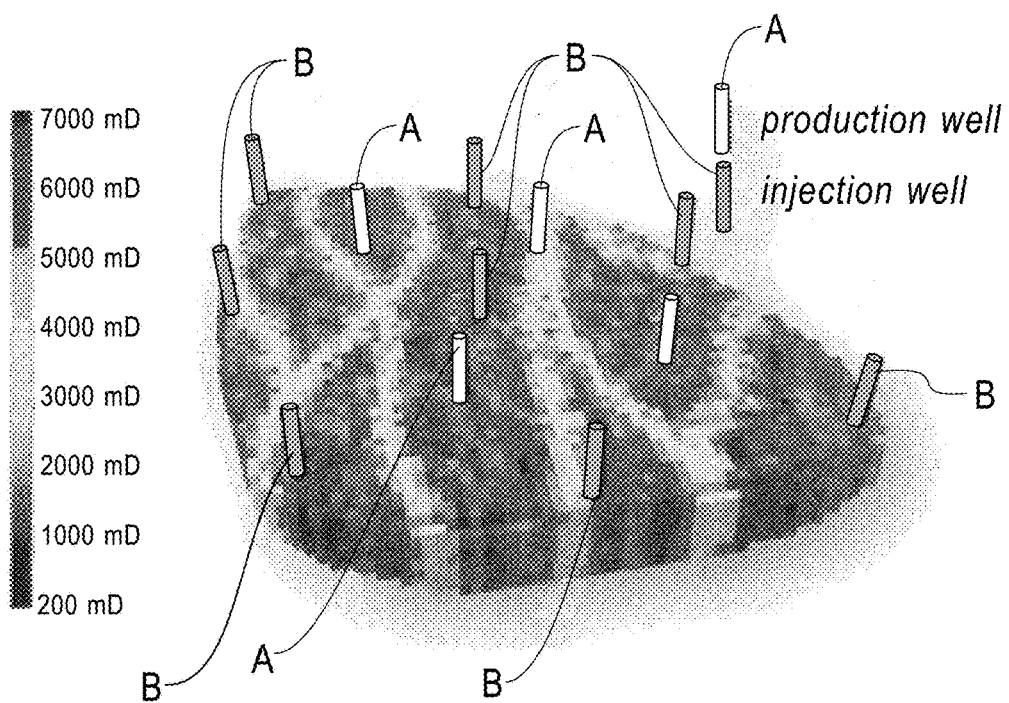
FIG. 5 illustrates the first example reservoir model (model 1 of FIG. 4A) in a 3d view (including also the location of the production wells (lighter rods—denoted as "A") and injection well (darker rods—denoted as "B") according to an embodiment of the present invention.
Figure 6:
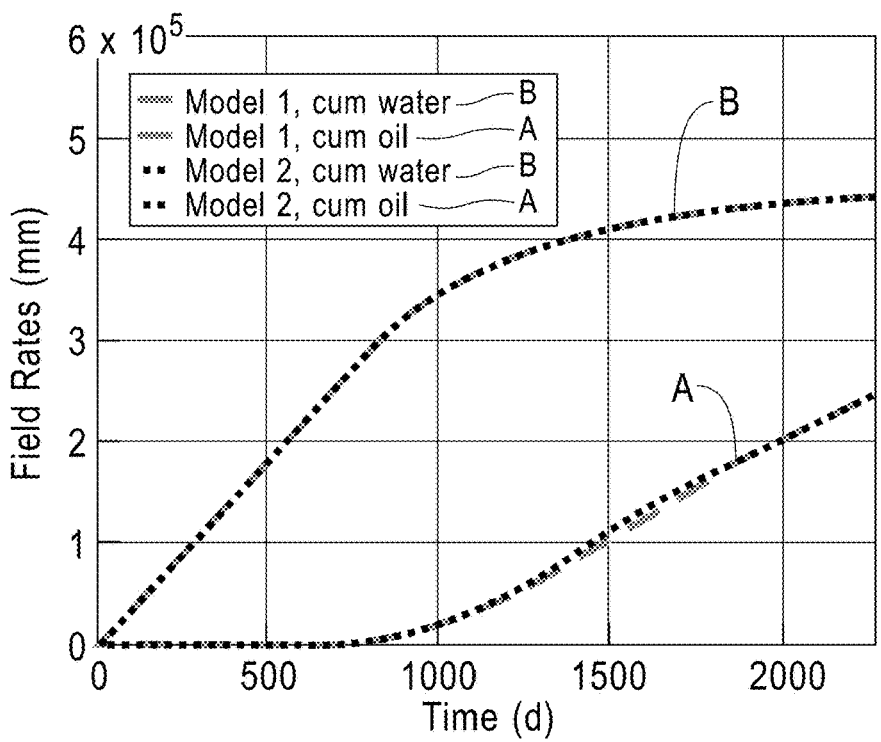
FIG. 6 illustrates cumulative oil (lower traces—denoted as "A") and water (upper traces—denoted as "B") production output of model 1 (see FIG. 4A and 5) and model 2 (see FIG. 4B) according to an embodiment of the present invention (the graph indicates that the two models (model 1 and model 2) provide similar production output, despite their geological dissimilarity).

In one embodiment, a computing system may implement and/or run the method 100 shown in FIG. 1 and the method 300 shown in FIG. 3. FIG. 2 illustrates examples of the computing system. Examples of the computing system may include, but are not limited to: a parallel computing system 200 including at least one processor 255 and at least one memory device 270, a mainframe computer 205 including at least one processor 256 and at least one memory device 271, a desktop computer 210 including at least one processor 257 and at least one memory device 272, a workstation 215 including at least one processor 258 and at least one memory device 273, a tablet computer 220 including at least one processor 259 and at least one memory device 274, a netbook computer 225 including at least one processor 260 and at least one memory device 275, a smartphone 230 including at least one processor 261 and at least one memory device 276, a laptop computer 235 including at least one processor 262 and at least one memory device 277, a physical server 240 including at least one processor 263 and at least one memory device 278, a software server 280, e.g., web server, HTTP server, application server, etc., and a wearable computer 290 including at least one processor 291 and at least one memory device 298.

In one embodiment, the methods shown in FIGS. 1 and 3 may be implemented as hardware on a reconfigurable hardware, e.g., FPGA (Field Programmable Gate Array) or CPLD (Complex Programmable Logic Device), by using a hardware description language (Verilog, VHDL, Handel-C, or System C). In another embodiment, the methods shown in FIGS. 1 and 3 may be implemented on a semiconductor chip, e.g., ASIC (Application-Specific Integrated Circuit), by using a semi custom design methodology, i.e., designing a semiconductor chip using standard cells and a hardware description language.

In one embodiment a method for estimating variability of future recovery of a natural resource is provided, the method comprising: receiving, from a database, a plurality of model realizations of the natural resource, the plurality of model realizations representing uncertainty in determining model properties of the natural resource; determining, for each of the plurality of model realizations, respective principal flow pattern coefficients representing a reduced model space; identifying similar principal flow patterns amongst the received plurality of model realizations using the coefficients representing the reduced model space; clustering the received plurality of model realizations according to the identified similar principal flow patterns in the reduced model space, each cluster having a similar principal flow pattern and representing a prior input to a computationally intensive history matching process; and determining variability in natural resource production by future recovery scenarios represented by one or more representatives of each of the clusters of the received plurality of model realizations, wherein the determining the variability comprises a subsequent history matching process and a consequent future simulation to estimate the future production scenarios of the natural resource; wherein a processor connected to a memory device is configured to perform: the receiving the plurality of model realizations, the determining the respective principal flow pattern coefficients, the identifying similar principal flow patterns, the clustering the received plurality of model realizations and the determining the variability.

In one example, the process of identifying similar principal flow patterns comprises: determining a distance between coefficients of the principal flow patterns of the received plurality of model realizations; and determining model realization cluster association based upon whether each determined distance is less than a pre-determined threshold.

In another example, each cluster represents a prior input to the computationally intensive history matching process, of which subsequent future simulation is performed to estimate a future production scenario of the natural resource.

In another example, the method further comprises: selecting a representative of each cluster; utilizing a respective representative model realization as prior input to the computationally intensive history matching process that employs historical production data; and subsequently performing future prediction of the natural resource production through simulation, whereby the prediction simulation run successfully represents the variability of the entire set of model realizations.

In another example, the method further comprises performing a singular value decomposition upon the flow indicators to enable reduced representation of respective associated flow patterns related to the dynamic behavior of each model realization.

In another example, the method further comprises: representing each flow pattern in a reduced space using a respective singular vector obtained from the singular value decomposition.

In another example, the method further comprises: hierarchically organizing each cluster, each cluster aggregating a set of one or more of the received model realizations.

In another embodiment a computer program product for estimating variability of future recovery of a natural resource is provided, the program code of the computer program product executable by a computer to perform a method comprising: receiving, from a database, a plurality of model realizations of the natural resource, the plurality of model realizations representing uncertainty in determining model properties of the natural resource; determining, for each of the plurality of model realizations, respective principal flow pattern coefficients representing a reduced model space; identifying similar principal flow patterns amongst the received plurality of model realizations using the coefficients representing the reduced model space; clustering the received plurality of model realizations according to the identified similar principal flow patterns in the reduced model space, each cluster having a similar principal flow pattern and representing a prior input to a computationally intensive history matching process; and determining variability in natural resource production by future recovery scenarios represented by one or more representatives of each of the clusters of the received plurality of model realizations, wherein the determining the variability comprises a subsequent history matching process and a consequent future simulation to estimate the future production scenarios of the natural resource.

In one example, the process of identifying similar principal flow patterns comprises: determining a distance between coefficients of the principal flow patterns of the received plurality of model realizations; and determining model realization cluster association based upon whether each determined distance is less than a pre-determined threshold.

In another example, each cluster represents a prior input to the computationally intensive history matching process, of which subsequent future simulation is performed to estimate a future production scenario of the natural resource.

In another example, the method performed further comprising: selecting a representative of each cluster; utilizing a respective representative model realization as prior input to the computationally intensive history matching process that employs historical production data; and subsequently performing future prediction of the natural resource production through simulation, whereby the prediction simulation run successfully represents the variability of the entire set of model realizations.

In another example, the method performed further comprising performing a singular value decomposition upon the flow indicators to enable reduced representation of respective associated flow patterns related to the dynamic behavior of each model realization.

In another example, the method performed further comprising: representing each flow pattern in a reduced space using a respective singular vector obtained from the singular value decomposition.

In another example, the method performed further comprising: hierarchically organizing each cluster, each cluster aggregating a set of one or more of the received model realizations.

In another embodiment a computer-implemented system for estimating variability of future recovery of a natural resource is provided, the system comprising: a processor; and a memory storing computer-readable instructions which, when executed by the processor, implement: a receiving element configured to receive, from a database, a plurality of model realizations of the natural resource, the plurality of model realizations representing uncertainty in determining model properties of the natural resource; a first determining element configured to determine, for each of the plurality of model realizations, respective principal flow pattern coefficients representing a reduced model space; an identifying element configured to identify similar principal flow patterns amongst the received plurality of model realizations using the coefficients representing the reduced model space; a clustering element configured to cluster the received plurality of model realizations according to the identified similar principal flow patterns in the reduced model space, each cluster having a similar principal flow pattern and representing a prior input to a computationally intensive history matching process; and a second determining element configured to determine variability in natural resource production by future recovery scenarios represented by one or more representatives of each of the clusters of the received plurality of model realizations, wherein the determining the variability comprises a subsequent history matching process and a consequent future simulation to estimate the future production scenarios of the natural resource.

In one example, the process of identifying similar principal flow patterns by the identifying element comprises: determining a distance between coefficients of the principal flow patterns of the received plurality of model realizations; and determining model realization cluster association based upon whether each determined distance is less than a predetermined threshold.

In another example, each cluster represents a prior input to the computationally intensive history matching process, of which subsequent future simulation is performed to estimate a future production scenario of the natural resource.

In another example, the system further comprises: a selecting element configured to select a representative of each cluster; a utilizing element configured to utilize a respective representative model realization as prior input to the computationally intensive history matching process that employs historical production data; and a prediction element configured to subsequently perform future prediction of the natural resource production through simulation, whereby the prediction simulation run successfully represents the variability of the entire set of model realizations.

In another example, the system further comprises: a singular value decomposition element configured to perform singular value decomposition upon the flow indicators to enable reduced representation of respective associated flow patterns related to the dynamic behavior of each model realization.

In another example, the system further comprises: an organizing element configured to hierarchically organize each cluster, each cluster aggregating a set of one or more of the received model realizations.

As described herein, a technique is provided to determine representatives for a priori geophysical scenarios with a view to make the production prediction of the natural resource into the future to account for uncertainty in a computationally tractable way.

In one specific example, the technique may characterize the dynamics and physical links via flow indicators, such as fluxes or Time of Flight of a reservoir model. Then, singular value decompositions may be used to both reduce the problem dimension and make clustering tractable.

In another specific example, the technique may enhance the amount of information one can gain from a single data acquisition modality (by virtue of excitation of the controls). In another specific example, the technique may be employed for multiple data sources.

In another specific example, the technique may involve intentional manipulation of the control (well rates, bottom hole pressures) excitation pattern for enhanced identifiability of the system (e.g., to thereby gain superior means to characterize the response of the system (i.e. the reservoir) to such input). That is, in another specific example, the technique may involve intentional manipulation of the controls in order to gain a better insight into the reservoir dynamic characterization (such an approach is also advantageous computationally, as only short simulations are required in order to get dynamics indicators of superior levels of distinguishability).

Various specific examples of controls excitations to enhance flow characterization that may be applied in the context of the present disclosure may be found in U.S. Ser. No. 14/447,165, the disclosure of which is incorporated herein by reference in its entirety. That is, the excitation disclosed in U.S. Ser. No. 14/447,165 may be used in the context of the present disclosure to accelerate the computation of the dynamic indicators, and further improve their distinguishability.

In another specific example, the technique may mitigate (or help to mitigate) uncertainty through exploration of the response of the system to various excitation patterns, rather than merely quantifying/describing the uncertainty as a given.

In another example, various implementations may be used to decide where to drill (e.g., where to drill an oil well or a gas well) and/or various implementations may be used to actually drill (e.g., actually drill an oil well or a gas well where it has been decided to do so).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art.

What is claimed is:

1. A method for estimating variability of future recovery of a natural resource, the method comprising:
receiving, from a database, a plurality of model realizations of the natural resource, the plurality of model realizations representing uncertainty in determining model properties of the natural resource;
determining, for each of the plurality of model realizations, respective principal flow pattern coefficients representing a reduced model space;
identifying similar principal flow patterns amongst the received plurality of model realizations using the coefficients representing the reduced model space;
clustering the received plurality of model realizations according to the identified similar principal flow patterns in the reduced model space, each cluster having a similar principal flow pattern and representing a prior input to a history matching process;
determining a set of history matched models by applying the history matching process on a set of selected model prior realizations, wherein the selected model prior realizations are a subset of representative realizations selected from the clustered realizations; and
determining variability in natural resource production by utilizing the set of history matched models as inputs to a prediction simulation tool, wherein the prediction simulation tool is configured to run simulations based on the set of history matched models to estimate the future production scenarios of the natural resource;

wherein a processor connected to a memory device is configured to perform: the receiving the plurality of model realizations, the determining the respective principal flow pattern coefficients, the identifying similar principal flow patterns, the clustering the received plurality of model realizations, the determining the set of history matched models, the determining the variability, and running the prediction simulation tool.

2. The method according to claim 1, wherein the process of identifying similar principal flow patterns comprises:
    determining a distance between coefficients of the principal flow patterns of the received plurality of model realizations; and
    determining model realization cluster association based upon whether each determined distance is less than a pre-determined threshold.

3. The method according to claim 1, wherein each cluster represents a prior input to the history matching process, of which subsequent future simulation is performed to estimate a future production scenario of the natural resource.

4. The method according to claim 1, further comprising:
    selecting a representative of each cluster to generate the selected model prior realizations.

5. The method according to claim 4, further comprising performing a singular value decomposition upon the flow indicators to enable reduced representation of respective associated flow patterns related to the dynamic behavior of each model realization.

6. The method according to claim 5, further comprising:
    representing each flow pattern in a reduced space using a respective singular vector obtained from the singular value decomposition.

7. The method according to claim 1, further comprising:
    hierarchically organizing each cluster, each cluster aggregating a set of one or more of the received model realizations.

8. A computer program product for estimating variability of future recovery of a natural resource, the program code of the computer program product executable by a computer to perform a method comprising:
    receiving, from a database, a plurality of model realizations of the natural resource, the plurality of model realizations representing uncertainty in determining model properties of the natural resource;
    determining, for each of the plurality of model realizations, respective principal flow pattern coefficients representing a reduced model space;
    identifying similar principal flow patterns amongst the received plurality of model realizations using the coefficients representing the reduced model space;
    clustering the received plurality of model realizations according to the identified similar principal flow patterns in the reduced model space, each cluster having a similar principal flow pattern and representing a prior input to a history matching process;
    determining a set of history matched models by applying the history matching process on a set of selected model prior realizations, wherein the selected model prior realizations are a subset of representative realizations selected from the clustered realizations; and
    determining variability in natural resource production by utilizing the set of history matched models as inputs to a prediction simulation tool, wherein the prediction simulation tool is configured to run simulations based on the set of history matched models to estimate the future production scenarios of the natural resource.

9. The computer program product according to claim 8, wherein the process of identifying similar principal flow patterns comprises:
    determining a distance between coefficients of the principal flow patterns of the received plurality of model realizations; and
    determining model realization cluster association based upon whether each determined distance is less than a pre-determined threshold.

10. The computer program product according to claim 8, wherein each cluster represents a prior input to the history matching process, of which subsequent future simulation is performed to estimate a future production scenario of the natural resource.

11. The computer program product according to claim 8, the method performed further comprising:
    selecting a representative of each cluster to generate the selected model prior realizations.

12. The computer program product according to claim 11, the method performed further comprising performing a singular value decomposition upon the flow indicators to enable reduced representation of respective associated flow patterns related to the dynamic behavior of each model realization.

13. The computer program product according to claim 12, the method performed further comprising:
    representing each flow pattern in a reduced space using a respective singular vector obtained from the singular value decomposition.

14. The computer program product according to claim 8, the method performed further comprising:
    hierarchically organizing each cluster, each cluster aggregating a set of one or more of the received model realizations.

15. A computer-implemented system for estimating variability of future recovery of a natural resource, the system comprising:
    a processor; and
    a memory storing computer-readable instructions which, when executed by the processor, implement:
    a receiving element configured to receive, from a database, a plurality of model realizations of the natural resource, the plurality of model realizations representing uncertainty in determining model properties of the natural resource;
    a first determining element configured to determine, for each of the plurality of model realizations, respective principal flow pattern coefficients representing a reduced model space;
    an identifying element configured to identify similar principal flow patterns amongst the received plurality of model realizations using the coefficients representing the reduced model space;
    a clustering element configured to cluster the received plurality of model realizations according to the identified similar principal flow patterns in the reduced model space, each cluster having a similar principal flow pattern and representing a prior input to a history matching process;
    a utilizing element configured to determine a set of history matched models by applying the history matching process on a set of selected model prior realizations, wherein the selected model prior realizations are a subset of representative realizations selected from the clustered realizations; and a prediction element configured to determine variability in natural resource production by utilizing the set of history matched models as inputs to a prediction simulation tool, wherein the prediction simulation tool is configured to run simulations based on the set of history matched models to estimate the future production scenarios of the natural resource.

16. The system according to claim 15, wherein the process of identifying similar principal flow patterns by the identifying element comprises:
determining a distance between coefficients of the principal flow patterns of the received plurality of model realizations; and
determining model realization cluster association based upon whether each determined distance is less than a pre-determined threshold.

17. The system according to claim 15, wherein each cluster represents a prior input to the history matching process, of which subsequent future simulation is performed to estimate a future production scenario of the natural resource.

18. The system according to claim 15, further comprising:
a selecting element configured to select a representative of each cluster to generate the selected model prior realizations.

19. The system according to claim 18, further comprising a singular value decomposition element configured to perform singular value decomposition upon the flow indicators to enable reduced representation of respective associated flow patterns related to the dynamic behavior of each model realization.

20. The system according to claim 15, further comprising:
an organizing element configured to hierarchically organize each cluster, each cluster aggregating a set of one or more of the received model realizations.

* * * * *